US008458154B2

(12) United States Patent
Eden et al.

(10) Patent No.: US 8,458,154 B2
(45) Date of Patent: Jun. 4, 2013

(54) METHODS AND APPARATUS TO CLASSIFY TEXT COMMUNICATIONS

(75) Inventors: Tal Eden, Tel Aviv (IL); Eliyahu Greitzer, Hertzelia (IL); Yakir Krichman, Givat Hen (IL); Michael Fuks, Ramle (IL)

(73) Assignee: Buzzmetrics, Ltd. (IL)

( * ) Notice: Subject to any disclaimer, the term of this patent is extended or adjusted under 35 U.S.C. 154(b) by 447 days.

(21) Appl. No.: 12/577,099

(22) Filed: Oct. 9, 2009

(65) Prior Publication Data

US 2011/0040837 A1 Feb. 17, 2011

Related U.S. Application Data

(60) Provisional application No. 61/234,042, filed on Aug. 14, 2009.

(51) Int. Cl.
*G06F 7/00* (2006.01)
*G06F 17/00* (2006.01)

(52) U.S. Cl.
USPC .......... 707/705; 707/722; 707/736; 707/737; 707/740; 707/753

(58) Field of Classification Search
USPC ............. 707/705, 722, 736, 737, 740, 753, 707/999.1, 999.7
See application file for complete search history.

(56) References Cited

U.S. PATENT DOCUMENTS

| 5,920,854 A | 7/1999 | Kirsch et al. |
| 5,983,216 A | 11/1999 | Kirsch et al. |
| 6,581,058 B1 * | 6/2003 | Fayyad et al. ................. 707/737 |
| 6,640,218 B1 | 10/2003 | Golding et al. |
| 6,826,724 B1 | 11/2004 | Shimada et al. |
| 7,788,087 B2 | 8/2010 | Corston-Oliver et al. |
| 7,802,009 B2 * | 9/2010 | Cui et al. ...................... 709/236 |

(Continued)

FOREIGN PATENT DOCUMENTS

| EP | 0980043 A2 | 2/2000 |
| JP | 2000285140 | 10/2000 |

(Continued)

OTHER PUBLICATIONS

"Shannon's Information Theory," Wikipedia, http://en.wikipedia.org/wiki/Shannon_information_theory, retrieved from the Internet on Aug. 12, 2010, with listing of Article History (16 pages).

(Continued)

*Primary Examiner* — Hares Jami
(74) *Attorney, Agent, or Firm* — Hanley, Flight & Zimmerman, LLC

(57) ABSTRACT

Methods and apparatus to classify text communications are disclosed. An example method includes determining a first conditional probability of a first feature occurring in a text given that the text belongs to a classification mode, wherein the first feature is included in the text, determining a second conditional probability of a second feature occurring in a text given that the text belongs to the classification mode, wherein the second feature is included in the text, determining a probability of the classification mode occurring, multiplying the first conditional probability, the second conditional probability and the probability of the classification mode to determine a product, and storing the product in a tangible memory as a score that the message belongs to the first classification mode.

22 Claims, 10 Drawing Sheets

U.S. PATENT DOCUMENTS

| | | | |
|---|---|---|---|
| 2002/0155793 A1 | 10/2002 | Jaro | |
| 2004/0059708 A1 | 3/2004 | Dean et al. | |
| 2004/0199498 A1 | 10/2004 | Kapur et al. | |
| 2006/0004622 A1* | 1/2006 | Fanelli et al. | 705/10 |
| 2006/0195534 A1* | 8/2006 | Isozaki et al. | 709/206 |
| 2006/0200342 A1 | 9/2006 | Corston-Oliver et al. | |
| 2006/0224552 A1 | 10/2006 | Riezler et al. | |
| 2007/0244690 A1* | 10/2007 | Peters | 704/8 |
| 2008/0082531 A1 | 4/2008 | Suarez | |
| 2008/0249764 A1* | 10/2008 | Huang et al. | 704/9 |
| 2008/0270116 A1 | 10/2008 | Godbole et al. | |
| 2010/0257117 A1* | 10/2010 | Shvadron et al. | 705/36 R |
| 2010/0262568 A1* | 10/2010 | Schwaighofer et al. | 706/12 |
| 2010/0312769 A1* | 12/2010 | Bailey et al. | 707/740 |

FOREIGN PATENT DOCUMENTS

| | | |
|---|---|---|
| JP | 2002175330 | 6/2002 |
| JP | 2003285140 | 10/2003 |
| JP | 2003330922 | 11/2003 |
| JP | 2009151390 | 7/2009 |

OTHER PUBLICATIONS

Toshiro Uchiyama et al., "A Multi-Classifier Combination Using Confidence Estimation", Material for the 84th SIG-KBS (SIG-KBS-A803), Japan, The Japanese Society for Artificial Intelligence, Jan. 20, 2009, Cover pp. (2), pp. 33-38 (8 pages), Cited in Japanese Office Action dated Jun. 26, 2012, which was previously submitted on Dec. 18, 2012.

Australian Government, IP Australia, Examiner's First Report on Patent Application No. 2010212373, Jun. 13, 2011, 3 pages.

European Patent Office, European Search Report for Application No. 10008293.2-1225/2287750, Mar. 23, 2011, 16 pages.

International Patent & Trademark Law, YKI Patent Attorneys, Correspondence, Jul. 26, 2012, 15 pages.

Bo Pang et al., Thumbs up? Sentiment Classification using Machine Learning Techniques, 8 pages.

Masaaki Nagata "Natural Language Processing and Learning Theory", Tutorial Material for First Annual Congress of the Assocation for Natural Language Processing, Japan, The Association for Naturai Language Processing, Mar. 29, 1995, Cover pp. (2), pp. 9-10 (4 pages). Cited in Japanese Office Action dated Jun. 26, 2012, which was previously submitted on Dec. 18, 2012.

Toshiro Uchiyama et al., "A Multi-Classifier Combination Using Confidence Estimation", Materiai for the 84th SIG-KBS (SIG-KBS-A803), Japan, The Japanese Society for Artificial Intelligence, Jan. 20, 2009, Cover pp. (2), pp. 33-38 (8 pages), Cited in Japanese Office Action dated Jun. 26, 2012, which was previously submitted on Dec. 18, 2012.

Australian Government, IP Australia, Patent Examination Report No. 2 issued in connection with Australian Patent Application No. 2010212373, Feb. 28, 2013, pp. 1-4.

* cited by examiner

| Sentence Index (1002) | Score for Mode #1 (1004) | (1006) | (1008) |
|---|---|---|---|
| 0 | 9.45 | | |
| 1 | 9.12 | Bucket 0 Mean 8.64 | Bucket 0 Mean 8.64 |
| 2 | 8.00 | | |
| 3 | 8.00 | | |
| 4 | 7.50 | | |
| 5 | 7.41 | Bucket 1 Mean 6.81 | Bucket 1 Mean 6.81 |
| 6 | 6.23 | | |
| 7 | 6.10 | | |
| 8 | 5.24 | | Bucket 2 Mean 5.18 |
| 9 | 5.12 | Bucket 2 Mean 5.03 | |
| 10 | 4.99 | | |
| 11 | 4.76 | | |
| 12 | 4.33 | | Bucket 3 Mean 4.30 |
| 13 | 4.26 | Bucket 3 Mean 4.01 | |
| 14 | 3.91 | | |
| 15 | 3.54 | | |
| 16 | 3.51 | | |
| 17 | 2.87 | Bucket 4 Mean 2.87 | Bucket 4 Mean 2.87 |
| 18 | 2.66 | | |
| 19 | 2.43 | | |
| 20 | 1.98 | | |
| 21 | 1.75 | Bucket 5 Mean 1.57 | Bucket 5 Mean 1.57 |
| 22 | 1.43 | | |
| 23 | 1.11 | | |
| 24 | 0.99 | | |
| 25 | 0.75 | Bucket 6 Mean 0.54 | Bucket 6 Mean 0.54 |
| 26 | 0.41 | | |
| 27 | 0.01 | | |

FIG. 10

| Sentence Index (1102) | Bucket Index (1104) |
|---|---|
| 0 | 0 |
| 1 | 0 |
| 2 | 0 |
| 3 | 0 |
| 4 | 1 |
| 5 | 1 |
| 6 | 1 |
| 7 | 1 |
| 8 | 2 |
| 9 | 2 |
| 10 | 3 |
| 11 | 3 |
| 12 | 3 |
| 13 | 3 |
| 14 | 3 |
| 15 | 3 |
| 16 | 4 |
| 17 | 4 |
| 18 | 4 |
| 19 | 4 |
| 20 | 5 |
| 21 | 5 |
| 22 | 5 |
| 23 | 5 |
| 24 | 6 |
| 25 | 6 |
| 26 | 6 |
| 27 | 6 |

FIG. 11

| Bucket Index (1202) | Representative Value (1204) |
|---|---|
| 0 | 8.64 |
| 1 | 6.81 |
| 2 | 5.18 |
| 3 | 4.30 |
| 4 | 2.87 |
| 5 | 1.57 |
| 6 | 0.54 |

FIG. 12

METHODS AND APPARATUS TO CLASSIFY TEXT COMMUNICATIONS

RELATED APPLICATIONS

This application is a non-provisional application and claims the priority of U.S. Provisional Patent Application No. 61/234,042, filed Aug. 14, 2009, entitled "METHODS AND APPARATUS TO CLASSIFY TEXT COMMUNICATIONS" the disclosure of which is incorporated by reference in its entirety.

FIELD OF THE DISCLOSURE

The present disclosure pertains to classifying text and, more particularly, to methods and apparatus to classify text communications.

BACKGROUND

The use of the internet as a location for discussions has influenced the desire to analyze such communications for useful information. Example internet communication mediums include discussion forums, instant messaging services, email, etc. In particular, businesses want to know what people are saying in these forums about their business(es) and/or product(s). One way for businesses to learn this information is to assign classifications to messages. For example, messages may be classified based on the sentiment expressed in the message. Summaries of the sentiment classifications can be reviewed to better understand the overall content of the messages.

BRIEF DESCRIPTION OF THE DRAWINGS

FIG. 10 illustrates an example association between sentence scores and buckets.

FIG. 11 illustrates an example of sentence indices and bucket indices that may be stored in a data structure.

FIG. 12 illustrates an example of bucket indices and representative values that may be stored in a data structure.

DETAILED DESCRIPTION

It is not feasible for a person to manually classify a large number of documents for analysis. Accordingly, computerized methods for classifying communications have been developed. These methods can be trained based on a small training set of classified messages and can apply the training to a large set of unclassified messages. Classification methods are rated based on recall and precision. Recall is the percentage of relevant documents collected out of all items and precision is the percentage of documents that are classified correctly.

Figure 1:
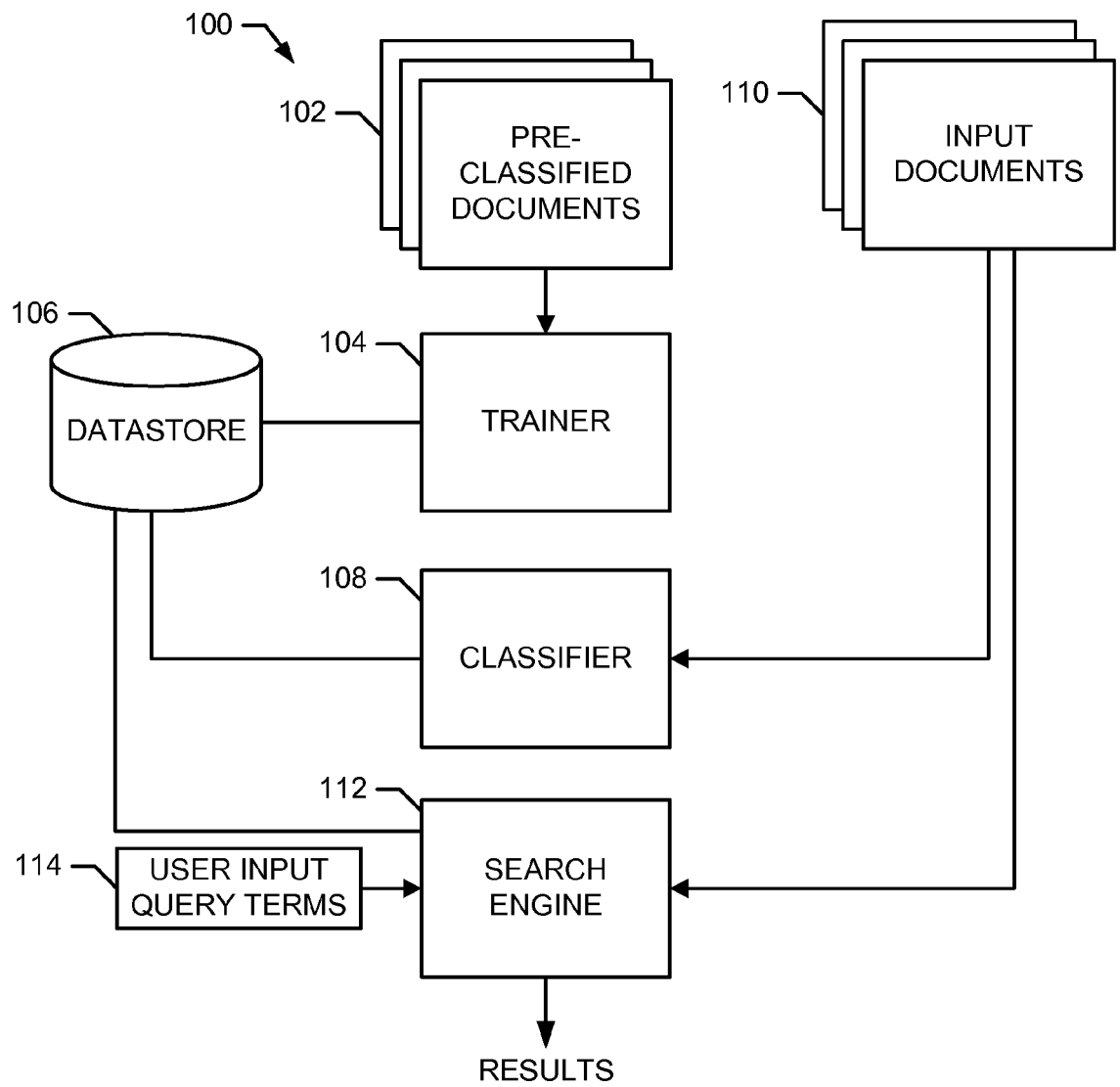
FIG. 1 is a block diagram of an example system to provide classification of text documents.

FIG. 1 is a block diagram of an example system 100 to provide classification of text documents that exhibits both high recall and high precision. In general, the example system 100 trains a classification model based on a set of documents that have been manually classified. The classification model is used to classify a received set of input documents and the results of the classification are indexed. At a later time, when a user of the system 100 performs a search, the results are displayed in combination with the classification information associated with the results. While the foregoing generally describes a general operation of the system 100, that description reflects an example implementation and further details and implementations are described herein.

The example system 100 of FIG. 1 includes a trainer 104, a datastore 106, a classifier 108, and a search engine 112.

Figure 2:
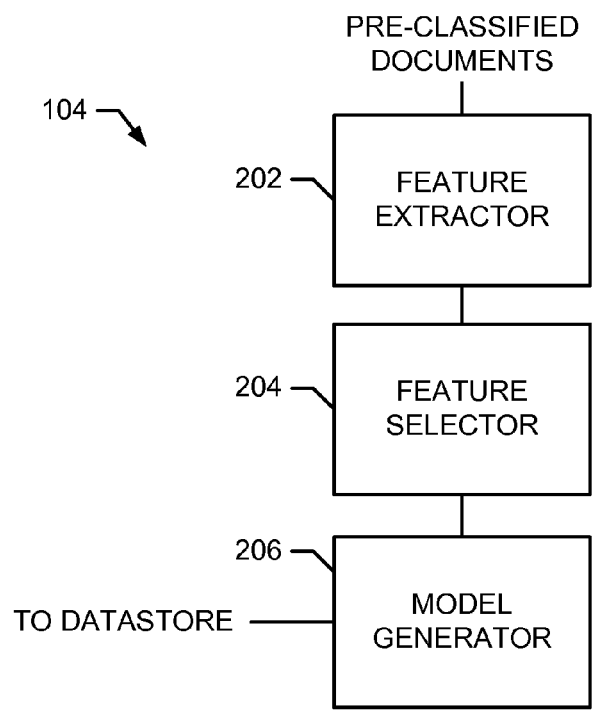
FIG. 2 is block diagram of an example implementation of the trainer of FIG. 1.

The trainer 104 of the illustrated example receives an input of pre-classified documents 102 (e.g., documents that have been manually classified) and outputs a classification model to be stored in the datastore 106. As illustrated in FIG. 2, an example implementation of the trainer 104 includes a feature extractor 202, a feature selector 204, and a model generator 206. The example feature extractor 202 receives the pre-classified documents 102 and extracts features from the documents to develop a feature dictionary (e.g., a feature created as in Table 1). In the illustrated example, a feature is a word or combination of words (e.g., a phrase) that are included in a document. A feature may additionally or alternatively be one or more words combined with a Boolean condition. Example Boolean conditions include:

&-AND—connects two or more conditions that must be met;
^-OR—connects two or more conditions where at least one must be met;
!-NOT—a connected condition must not be met;
(x,y)—a first word should appear more than x words but less than y words before a second word.

The example feature extractor 202 creates Boolean grouped features using the Groups Method. Grouped features represent patterns or associations of words that are included in documents. The Groups Method uses a hierarchical set of conditions in which a group is created by a combination of words or a combination of lower order Boolean conditions.

An example grouped feature for pronouns may be represented as: ^ pron, he, he has, he is, he will, he would, he'd, he had, he'll, he's, hes, i, i am, i had, i have, i will, i would, i'd, i'll, i'm, i've, ive, she, she had, she is, she will, she would, she'd, she'll, she's, shes, they, they are, they're, we, we are, we're, you, you are, you're, youre. An example grouped feature for comparison words may be represented as: ^comparison_words, accept for, acting like, after, ahead of alternative, any, any problem, any problems, argue, as good as, as much, as much, as well, atleast, axcept, beat, beating, before, but, compare, compared, comparison, compete, competeing, competing, eccept for, even close, even if, even though, even though, except, hardly, has it gotten, haven't noticed, havent noticed, in and out, instead, least, less, mistake, moderate, more, never, no problem, no problems, nor, otherwise, rather, reliability issue, reliability issues, should have, so notorious, suppose, supposed, though, until, vs, while, why can't, would have. An example grouped feature for recognizing when a person states that they wish that they had something may be represented as: &wishhad, wish, had (0, 2), which matches the word wish followed by exactly one word followed by the word had.

The dictionary created by the feature extractor 202 of the illustrated example includes an indication of how many times each feature occurred for each classification mode. A classification mode is a classification that may be assigned to a particular document or message. For example, classification modes identifying the sentiment expressed in a document or message may include Positive, Negative, Mixed Opinion, and No Opinion. The dictionary may include an assignment of verticals, which are code names for subject areas (e.g., customer technology, nutrition, gaming, etc.). The dictionary may also store separate occurrence counts for each vertical. For example, if there are four modes (e.g., Positive, Negative, Mixed, No Opinion), the dictionary will include one line for each feature and each line will include one number for each of the four modes. An example dictionary may include the following two entries:

TABLE 1

Example feature dictionary entries.

|  | Mode #1 | Mode #2 | Mode #3 | Mode #4 |
| --- | --- | --- | --- | --- |
| Feature #1 | 9000 | 500 | 1000 | 5000 |
| Feature #2 | 600 | 3500 | 300 | 1700 |

After the example feature extractor 202 generates the feature dictionary, the feature selector 204 of the example trainer 104 selects a subset of the features in the feature dictionary for analysis. For example, the most significant features may be selected for analysis to reduce the size of the dictionary and to reduce the number of features that must be analyzed in a classification. The example feature selector 204 uses Shannon Information Theory to select approximately 8000 features that are most significant in differentiating between the classification modes. In other examples, any number of features may be selected and any method for choosing the features may be used. The feature selector 204 transmits the revised feature dictionary to the model generator 206.

The model generator 206 receives the feature dictionary revised by the feature selector 204 from the feature selector 204 and prepares the dictionary for use as a classification model. The model generator 206 may adjust values in the dictionary to ensure that no feature is deterministic of a classification. In the illustrated example, when any feature has an occurrence value of zero for any of the classification modes, that occurrence value is replaced with 0.5 to avoid the zero probability causing any classification mode to be statistically ruled out by a single feature. After adjusting the revised dictionary, the model generator 206 stores the dictionary to be used as a model in the datastore 106. According to the illustrated example, the dictionary is stored as a text file in the format shown in Table 1. However, any format and data structure may be used for storing the dictionary.

Figure 3:
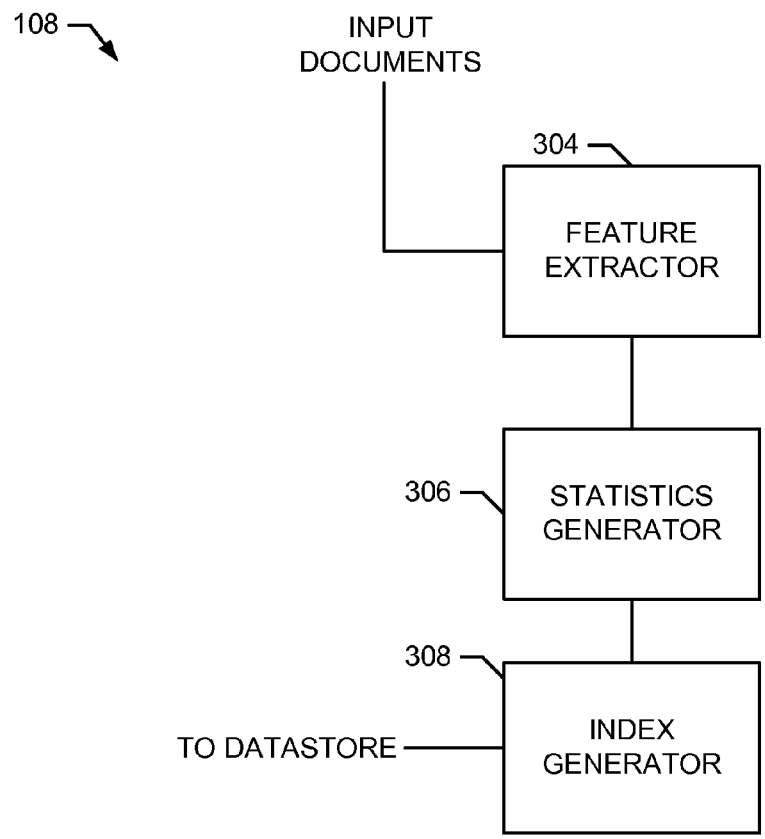
FIG. 3 is a block diagram of an example implementation of the classifier of FIG. 1.

Returning to FIG. 1, after training is completed, the classifier 108 accesses the classification model stored in the datastore 106 by the trainer 104 and classifies the input documents 110. The input documents 110 may be any type of documents that are to be classified into classification modes. For example, the input documents 110 may be electronic communications from the internet (e.g., electronic messages posted to a discussion forum). The example classifier 108 may be implemented as shown in FIG. 3 by a feature extractor 304, a statistics generator 306, and an index generator 308.

The feature extractor 304 of the illustrated example analyzes each document and extracts features for each sentence in the document. The example statistics generator 306 then determines a set of probabilities, with each probability in the set indicating a likelihood of the sentence belonging to a corresponding one of the classification modes. An example process for determining the probabilities is described in conjunction with FIG. 5. The statistics generator 306 outputs a set of probabilities (e.g., one probability for each classification mode). To reduce the time and space complexity of storing the statistical information, the index generator 308 of the illustrated example buckets and indexes that information. The index generator 308 stores the indexed information in the datastore 106 for later recall when a query is performed and results are to be displayed. Example processes for bucketing and indexing the information are described in conjunction with FIGS. 5 and 6.

Returning to FIG. 1, at some time after the index has been stored by the classifier 108, user input query terms 114 are provided to the search engine 112. The example search engine 112 searches the input documents 110 and provides the search results to the user. The user may then request a classification analysis of the messages. For example, when a large number of results are returned, a user may want to see a classification analysis to see how many messages were classified in each of the classification modes to get a general idea of what people are saying in relation to the terms submitted in the query. Using the index stored in the datastore 106, the search engine 112 displays the analysis. For example, a graph (e.g., a line graph, a bar graph, a pie chart, etc.) showing the number or percentage of query result messages that fall in each of the classification modes may be displayed. Using the displayed analysis, the user may request to view messages from a particular classification. For example, a user may request to view all messages that were classified as negative. In response to the request, the example search engine 112 displays a list of matching messages. The list of messages may be sorted by a confidence level indicative of how confident the search engine 112 is that the message matches the classification. An example process for implementing the search process of the search engine 112 is described below in conjunction with FIG. 7.

The datastore 106 of the illustrated example may be any type of data storage. For example, the datastore 106 may be a database, a tangible memory, a register, a data structure, or any combination of these or other data storage structures. Further, multiple data storage structures may be used to store the index, classification dictionary, or other data of the example system 100.

Flowcharts representative of example machine readable instructions that may be executed to implement some or all of the elements of the system 100 are shown in FIGS. 4-9.

In these examples, the machine readable instructions represented by each flowchart may be implemented by one or more programs, routines, or processes, and may be executed by: (a) a processor, such as the microprocessor 1305 shown in the example processor platform 1300 discussed below in connection with FIG. 13, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1305, but the entire program or programs and/or portions thereof could alternatively be executed by a device other than the microprocessor 1305 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example system 100 including the example trainer 104, the classifier 108, and the search engine 112 could be implemented by any combination of software, hardware, and/or firmware. Also, some or all of the processes represented by the flowcharts of FIGS. 4-9 may be implemented manually.

If any of the appended claims is read to cover a purely software implementation, at least one of the trainer 104, classifier 108, search engine 112, feature extractor 202, feature selector 204, model generator 206, feature extractor 302, statistics generator 304, and index generator 308 are hereby expressly defined to include a tangible medium such as, for example, a memory, DVD, CD. Further still, the example trainer 104, classifier 108, and search engine 112 may include data structures, elements, processes and/or devices instead of, or in addition to, those illustrated in the drawings and described above, and/or may include more than one of any or all of the illustrated data structures, elements, processes and/ or devices.

Further, although the example machine readable instructions] are described with reference to the flowcharts illustrated in FIGS. 4-9, many other techniques for implementing the example methods and apparatus described herein may alternatively be used. For example, with reference to the flowcharts illustrated in FIGS. 4-9, the order of execution of the blocks may be changed, and/or some of the blocks described may be changed, eliminated, combined, and/or subdivided into multiple blocks.

Figure 4:
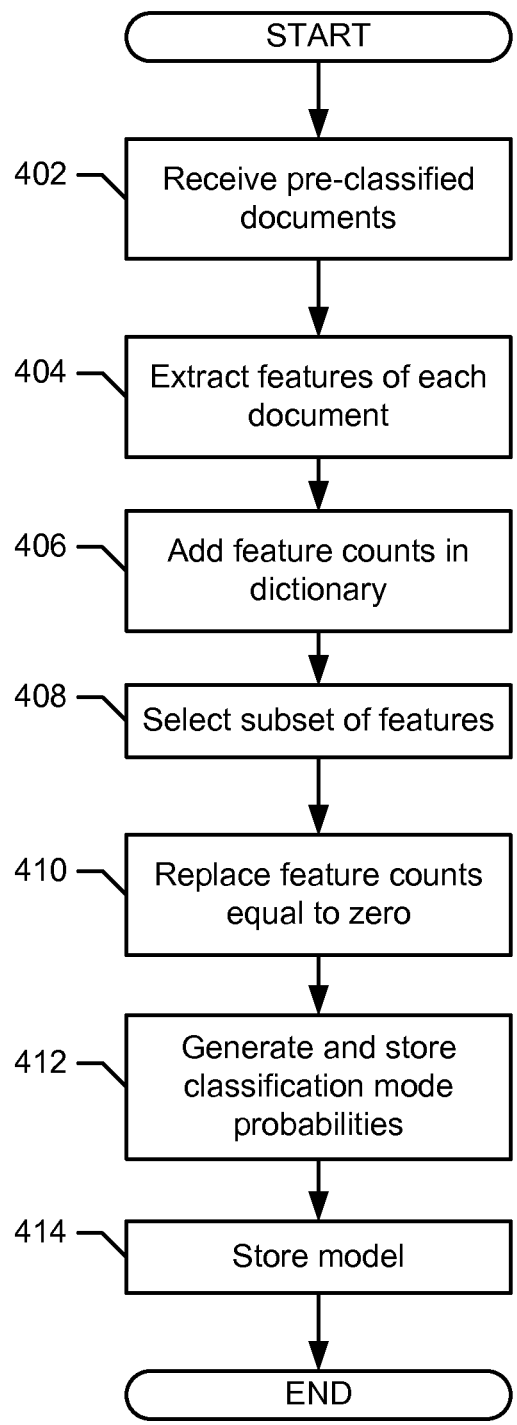
FIG. 4 is a flowchart representation of example machine readable instructions that may be executed to implement the trainer of FIGS. 1 and 2.

FIG. 4 is a flowchart of an example process to implement the trainer 104 of FIGS. 1 and 2. The process of FIG. 4 begins when the feature extractor 202 receives pre-classified documents (block 402). For example, the documents may have been manually classified or classified using another classification system to identify the classification mode of the document. The feature extractor 202 then extracts features from the pre-classified documents (block 404). The extracted features are added to a classification dictionary (block 406). According to the illustrated example, each time a feature is found in a document, a count for the classification mode of the document (e.g., as received with the pre-classified documents) associated with the feature in the classification dictionary is incremented. For example, if a document was identified, when received, as belonging to the classification "Mode #1" then the counter for classification "Mode #1" would be incremented. In other words, after all documents have been analyzed, each feature will include a count value for each classification mode indicative of the number of times that the feature was found in a document pre-classified as that classification mode. Next, the example feature selector 204 selects to retain significant features from the dictionary (block 408). For example, significant features may be extracted and stored in a revised feature dictionary or features determined not to be significant may be removed from the dictionary. The example model generator 206 then replaces any feature counts that are zero with a small number (e.g., 0.5) (block 410). The model generator 206 then determines and stores probabilities for each classification mode (block 412). For example, the model generator 206 may determine the probability that a message belongs to a Positive classification mode by dividing the number of documents labeled as Positive by the total number of documents (e.g., Positive, Negative, Mixed, and No Opinion documents). The model generator 206 then stores the created classification dictionary as a classification model in the datastore 106 of FIG. 1 (block 414).

Figure 5:
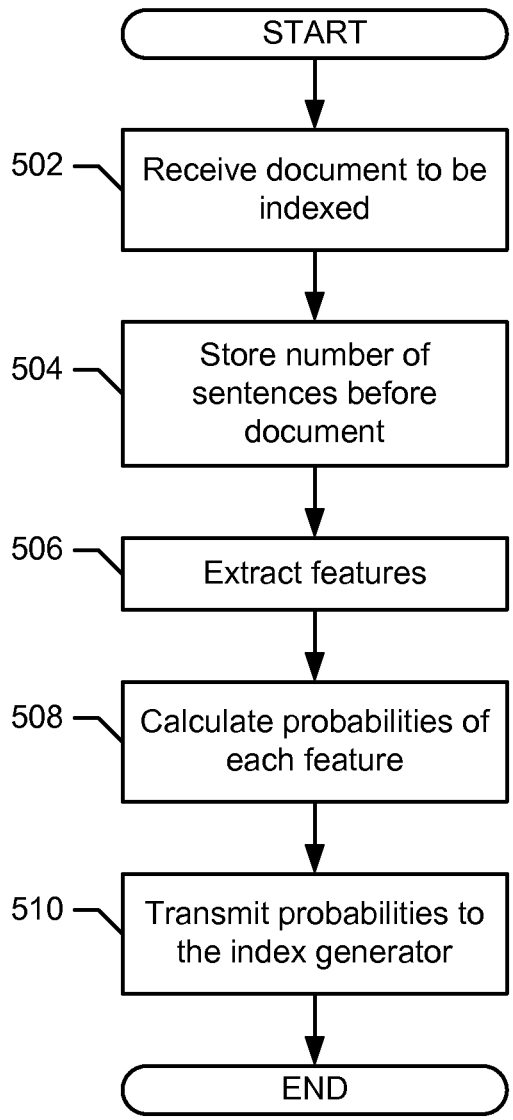
FIG. 5 is a flowchart representation of example machine readable instructions that may executed to implement a classification process for the classifier of FIG. 1.

FIG. 5 is a flowchart representative of example machine readable instructions to implement a classification process for the classifier 108 of FIG. 1. The example process of FIG. 5 begins when the feature extractor 304 receives an input document to be classified (block 502). The feature extractor 304 stores in a classification table the number of sentences that have been analyzed prior to analyzing current document (block 504). In other words, when documents are stored consecutively in a data structure, the location of the document in a data store can be defined by the number of sentences that precede the document in the data structure. Accordingly, storing the number of sentences prior to the document enables a document to be quickly located in a document store at a later time. The feature extractor 304 then extracts features found in the document (block 506). For each feature, the statistics generator 306 determines a set of probabilities that the subject feature indicates that the document belongs to a respective set of classification modes (block 508). According to the illustrated example, the probability that a message (one or more sentences) belongs to a classification mode is determined as follows:

The conditional probability of a feature occurring in a document given to belong to a specific classification mode is calculated as:

$$P(\text{feature}/\text{mode}) = \frac{\text{number of appearances of the feature in the specific mode}}{\text{total sum of features in the specific mode}}.$$

The conditional probability of a message given that a document belongs to a specific classification mode is calculated as:

$$P(\text{message} \mid \text{mode}) = \prod_{i=1}^{n} P(\text{feature}_i \mid \text{mode}),$$

where n is the number of features in the message.

The probability score indicating how likely an analyzed message occurs in a document belonging to a particular classification is calculated using Bayes law as the joint probability: P(message∩mode)=P(message|mode)P(mode). The probability score is taken as the likelihood that a particular message belongs to a particular classification mode. The probability for a mode may be an overall probability or may be the probability for the mode in the relevant vertical.

Because there may be many features to be multiplied, the probability scores may be very small, which may make them difficult to store. Accordingly, the example statistics generator 306 uses the logarithmic space. Thus, the final probability score of a classification mode for each message is calculated as:

$$\text{Log}[P(\text{message} \mid \text{mode})] = \text{Log}\left[\left(\prod_{i=1}^{n} P(\text{feature}_i \mid \text{mode})\right) P(\text{mode})\right] =$$

$$\sum_{i=1}^{n} \text{Log}[P(\text{feature}_i \mid \text{mode})] + \log[P(\text{mode})]$$

The above calculation is performed for each classification mode to determine each of the probability scores. At this time, a classification mode for each sentence could be determined to be the classification mode with the greatest score. Likewise, a confidence level could be determined by dividing the probability score for the selected classification mode by the probability score for the second most likely classification mode. The confidence in the selected classification mode increases as the confidence level approaches zero.

In to the illustrated example, the statistical data generated by the statistical generator 306 is transmitted to the index generator 308 for use in building an index (block 510).

While the foregoing example of FIG. 5 describes the statistical analysis of a single message, the process may be repeated to analyze a plurality of received messages and/or documents. The statistical information may be sent (block 510) after each analysis or may be sent after all analyses have been completed. In addition, the process of FIG. 5 may be performed as new documents are received. For example, the process may be performed when a document in a new language (e.g., Italian, Hebrew, German, English, etc.) has been received (e.g., after a new model for that language has been added to the datastore 106). Advantageously, the system of FIG. 1 can operate upon documents of any language as long as a model of features for that language has been developed. The method of analyzing the data is the same irrespective of the language of the document and consistent results are obtained irrespective of the language.

Figure 6:
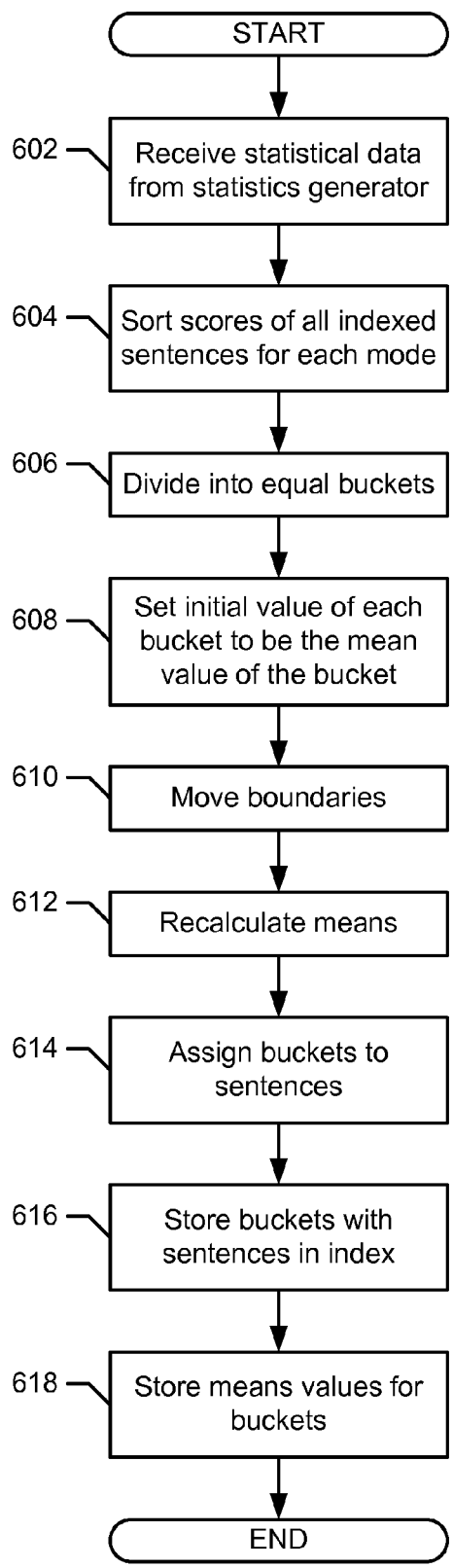
FIG. 6 is a flowchart representation of example machine readable instructions that may be executed to implement the index generator of FIG. 3.

FIG. 6 is a flowchart representative of example machine readable instructions to implement the index generator 308 of FIG. 3. The process of FIG. 6 begins when the index generator 308 receives statistical data from the statistics generator 306 (block 602). The example index generator 308 sorts the probability score values (e.g., probability scores calculated as described in FIG. 5) of all sentences for each classification mode by probability score (i.e., to generate a sorted list for each mode) (block 604). In other words, a sorted list of probability scores in the statistical data is obtained for each classification mode (i.e., four lists when there are four classification modes). Each sorted list is then divided into buckets (block 606). For example, the lists may each be divided into 256 equal sized buckets. Each bucket is initialized to be representative of the mean of all values that fall in the bucket (block 608). While the mean value is used as an approximation of the various logarithmic probability scores that fall in each bucket, any representative value may be used. For example, the representative value may be a median value, a maximum value, a minimum value, or any other type of value that may be representative of the probability scores in a bucket. The boundaries of the buckets are then moved (block 610) and the mean values are recalculated (block 612) to cause the buckets to be an effective representation of the data in the buckets. For example, the deviation or difference of the scores in the bucket from the mean value may be calculated and the boundaries may be adjusted (e.g., moved one score in a particular direction) to reduce such deviation or difference. Because adjusting the boundary of one bucket will inherently cause a change to an adjacent bucket, the boundary changes may be evaluated to determine if an increase to the deviation or difference in the adjacent bucket is greater than the decrease in the deviation or difference in the bucket being analyzed. Blocks 610 and 612 may be repeated multiple times. For example, blocks 610 and 612 may be repeated three times to adjust the bucket values. Alternatively, blocks 610 and 612 may be repeated until adjustments are no longer effective or a threshold improvement cannot be obtained by adjustments. By representing probability scores using buckets, a list of representative values for each bucket can be stored in a single list or table and each stored classification can be assigned a bucket number (e.g., 0 to 255) that can be stored in fewer data bits (e.g., 8 binary bits) than a floating point probability score.

Once the buckets for each classification mode have been adjusted, a bucket number is assigned to each sentence for each classification mode (block 614). The bucket assigned sentences are then stored in an index in the datastore 106 of FIG. 1 (block 616). In addition, the final mean values for each bucket are also stored (block 618).

Figure 7:
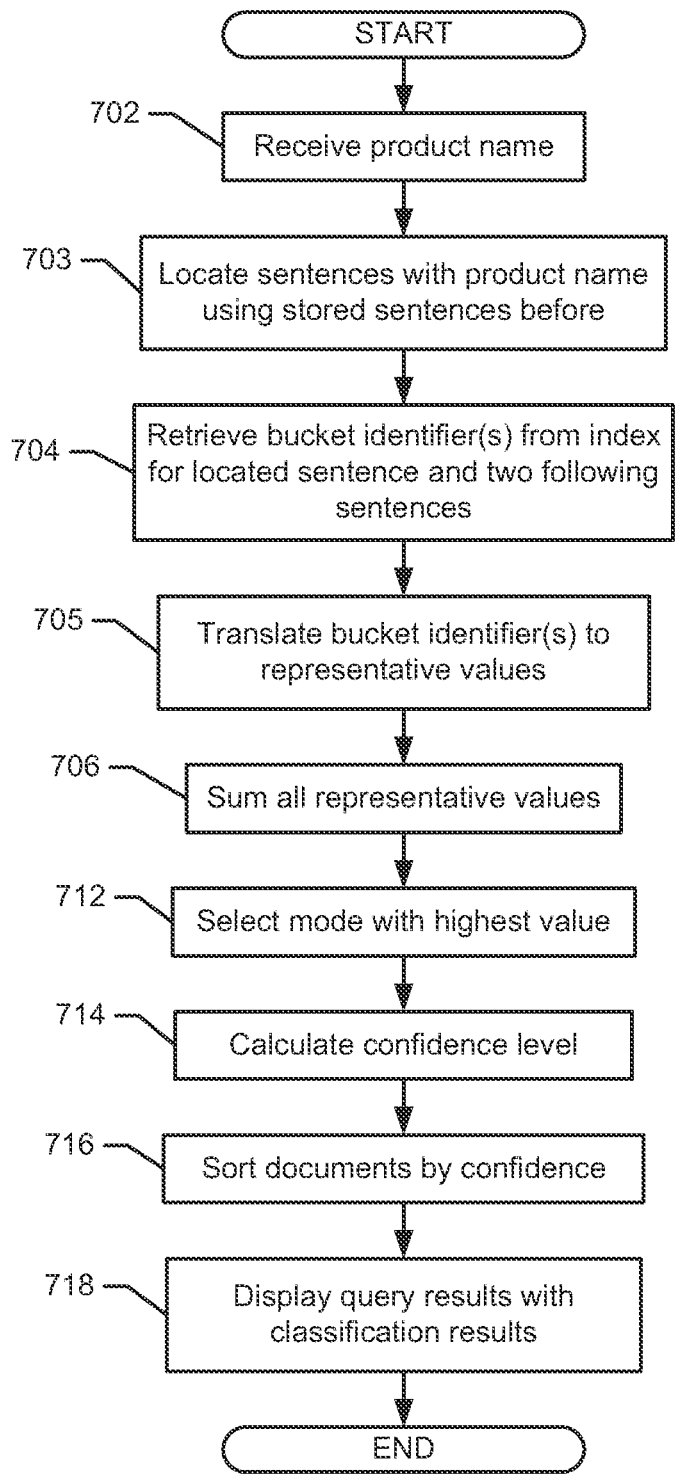
FIG. 7 is a flowchart representation of example machine readable instructions that may be executed to provide a classification of a document.

FIG. 7 is a flowchart of an example process to provide a classification of a document. The flowchart of FIG. 7 begins when the search engine 112 receives a query from a user (e.g., a product name) (block 702). The search engine 112 locates sentences with the query terms (e.g., product names) in the index and locates the position(s) of the sentence(s) in the data set using the value for the number of sentences before the current document that was previously stored in block 504 of FIG. 5 (block 703). Then, the search engine 112 retrieves bucket identifiers from the previously stored index for the located sentence and the two sentences following the located sentence (block 704). The search engine 112 then translates the retrieved bucket identifiers to representative values using the translation table stored in block 618 of FIG. 6 (block 705). For example, the search engine 112 may translate the bucket identifiers to mean values that are representative of the respective probability scores. Then, for each document, the search engine 112 sums the translated representative values (block 706). Alternatively, only the representative values of the located sentence or any number of additional preceding or following sentences may be summed. Additionally, when an index is not used, the classification scores may be determined using any other means including performing classification calculations at the time a query is received.

For each document, the search engine 112 compares the summed probability scores of the classification modes. The classification mode with the highest probability score is selected as the classification for the document (block 712). The confidence level for each document is then calculated by dividing the probability score for the selected classification mode with the probability score of the next highest classification mode for that document (block 714). The documents are then sorted by confidence score, the smallest confidence score (i.e., more confident classifications) being listed first (block 716). The example search engine then displays the results of the query with the classification results sorted by confidence score (block 718). The search results may be displayed in any manner. For example, a listing of the results may be displayed without classification information. The classification information may, however, be displayed in response to a request from a user. For example, a graph of the number of documents in each classification mode may be presented and a user may request to view messages from a particular one of the classification modes.

When the results are displayed, a user may view summary information and/or may view classification information associated with a particular document, message, sentence, etc. When a particular document, message, or sentence is displayed with classification information, a user may have the option of correct the computed classifications. An example process for processing correction is described in conjunction with FIG. 8.

Figure 8:
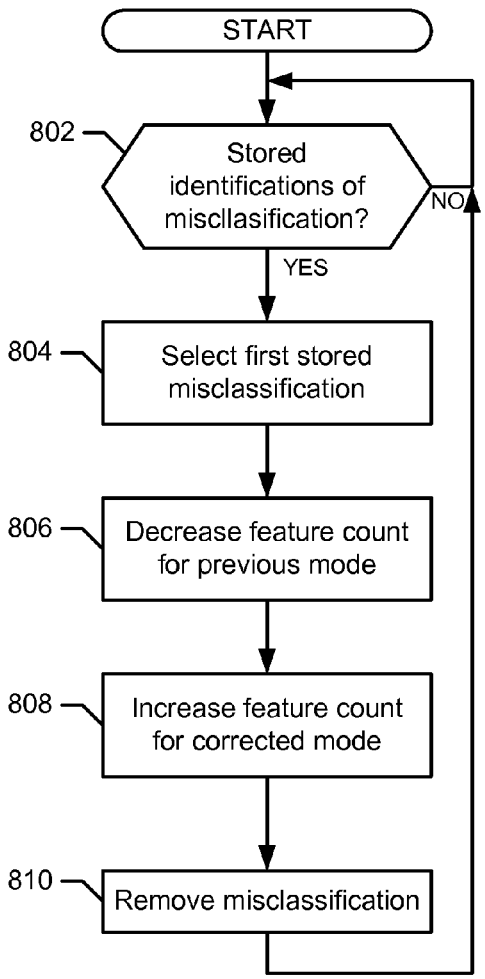
FIG. 8 is a flowchart representation of example machine readable instructions that may be executed to account for user identifications of misclassifications.

FIG. 8 is a flowchart representative of example machine readable instructions to account for user identifications of misclassifications. The process of FIG. 8 begins when the search engine 112 determines if any misclassification identifications have been stored (block 802). For example, when a user identifies a result as a misclassification that user entry is stored. The user may indicate a correct classification for the message. If so, the correct classification is also stored. When there are no misclassifications, the search engine 112 continues to wait for a misclassification. For example, the search engine 112 may check for misclassifications after every fixed amount of time.

When there are misclassifications (block 802), the search engine selects the first stored misclassification for processing (block 804). The search engine 112 decreases the feature count in the index for the classification mode that was identified as incorrect (block 806). In the illustrated example, the feature count will not be decreased lower than 0.5 to prevent any feature probability from being set to zero and statistically eliminating a classification mode. The search engine 112 then increases the feature count for the classification mode identified as the correct classification (block 808). Accordingly, the classification system will learn from the incorrect classifications by adjusting the counts stored in the index. The misclassification is removed and control returns to block 802 to determine if there are further misclassifications to process (block 810).

Figure 9:
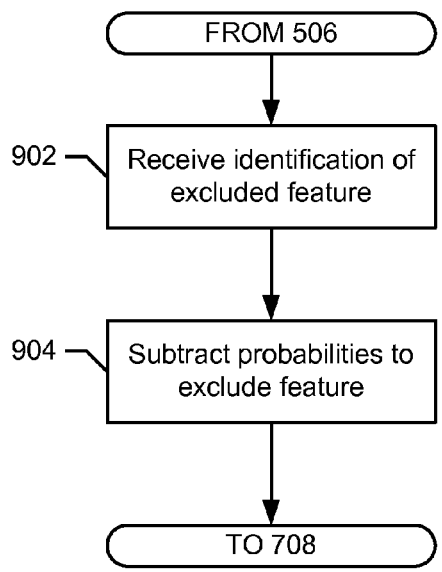
FIG. 9 is a flowchart representation of example machine readable instructions that may be executed in conjunction with the example instructions of FIG. 7 to allow a user to exclude features from influencing the classification results.

FIG. 9 is a flowchart of machine readable instructions that may be executed in conjunction with the instructions of FIG. 7 to allow a user to exclude features from influencing the classification results. For example, a user may wish to exclude a feature that may also be a product name. For example, a product name might be Bad Device, but the word bad is typically associated with a feature indicating a negative opinion of a product. The process of FIG. 9 begins after block 706 of FIG. 7 when an identification of a feature to be excluded is received (block 902). The search engine 112 determines the probabilities associated with the identified feature to be excluded and decreases the logarithmic probabilities to eliminate the influence of the feature (block 904). Control then proceeds to block 708 to continue the results process. Accordingly, the influence of the feature on the probability determination is removed for the current search without changing the underlying dictionary.

FIG. 10 illustrates an example association between sentence scores and buckets. In the illustrated example, a set of sentence indices 1002 are representative of a set of sentences located in documents. For example, the set of sentences may be 28 consecutive sentences in a document. While only 28 sentences are shown, any number of sentences may be determined from a document or set of documents. The scores for mode #1 1004 are the scores calculated for each of the sentences indicating the logarithmic probability that respective sentences belong to classification mode #1. For example, the scores may be calculated as described in FIG. 5. To reduce the space complexity of storing scores 1004 of each sentence, the buckets 1006 and 1008 are determined. For example, where each score is a floating point number, significant storage space is used to store each score. By assigning buckets 1006 and 1008, a bucket index can be stored in a smaller representation (e.g., an integer value).

The example buckets 1006 may, for example, be determined by the instructions of blocks 602 to 606. The buckets 1006 are assigned such that each bucket has an equal number of member scores 1004. The mean scores may, for example, be determined by the instructions of block 608 to be the mean of the member scores 1004. Thus, the scores 1004 can be represented by the index of the bucket 1006 to which they are assigned and the index of the bucket can be translated to the representative value (e.g., the mean value).

The example buckets 1008 may, for example, be determined by the instructions of blocks 610 to 618. For example, the buckets 1008 may be determined after adjusting the bucket boundaries to make the mean values more closely representative of the scores in the buckets (e.g., by reducing the deviation of the scores from the mean of the respective bucket. As shown in the illustrated example, the boundaries of bucket 2 in the buckets 1008 has been moved so that bucket 2 only includes sentences 8 and 9 and the boundaries of bucket 3 in the buckets 1008 has been moved so that bucket 3 includes sentences 10-15. Accordingly, the mean values have been recalculated. Thus, adjusting the boundaries of the buckets 1008 has resulted in representative value (e.g., mean values) for bucket 2 that more closely reflects the scores in the bucket. For example, the total difference between the scores in bucket 2 and the mean of bucket 2 in 1006 is |5.24−5.03|+|5.12−5.03|+|4.99−5.03|+|4.76−5.03|=0.61. After the boundary adjustment to obtain 1008, the total difference in bucket 2 is 0.12. Thus, the mean of bucket 2 more closely represents the scores in bucket 2 after the move. Further adjustments could take into account the changes to bucket 1 caused by the move of the boundary for bucket 2. Of course, bucket boundaries may be adjusted for any reason. For example, bucket boundaries may be adjusted until the deviation of the scores does not exceed a threshold, to be exponential, logarithmic, etc. Alternatively, no adjustment of bucket boundaries may be performed when the initial assignment is determined to be satisfactory.

FIG. 11 illustrates an example of sentence indices 1102 and bucket indices 1104 that may be stored in a data structure. The example sentence indices 1102 and bucket indices 1104 may be determined from the associations in FIG. 10. Advantageously, the sentence indices 1102 and bucket indices 1104 may consume less memory during storage than storing the full scores for each sentence because the bucket indices 1104 can be stored in a smaller data type.

FIG. 12 illustrates an example of bucket indices 1202 and representative values 1204 that may be stored in a data structure. The data structure illustrated in FIG. 12 may be used as a look up table to translate, for example, the bucket indices 1102 of FIGS. 11 and 1202 to representative values 1204. The representative values are approximations of the scores for sentences that were in the buckets corresponding to the bucket indices 1202. Thus, according to the illustrated example, because there are four times more sentence indices 1102 of FIG. 11 than there are representative values 1204, approximately one fourth the memory will be used in storing the data structure of FIG. 12 than would be needed to score the actual scores for each sentence index 1102.

Figure 13:
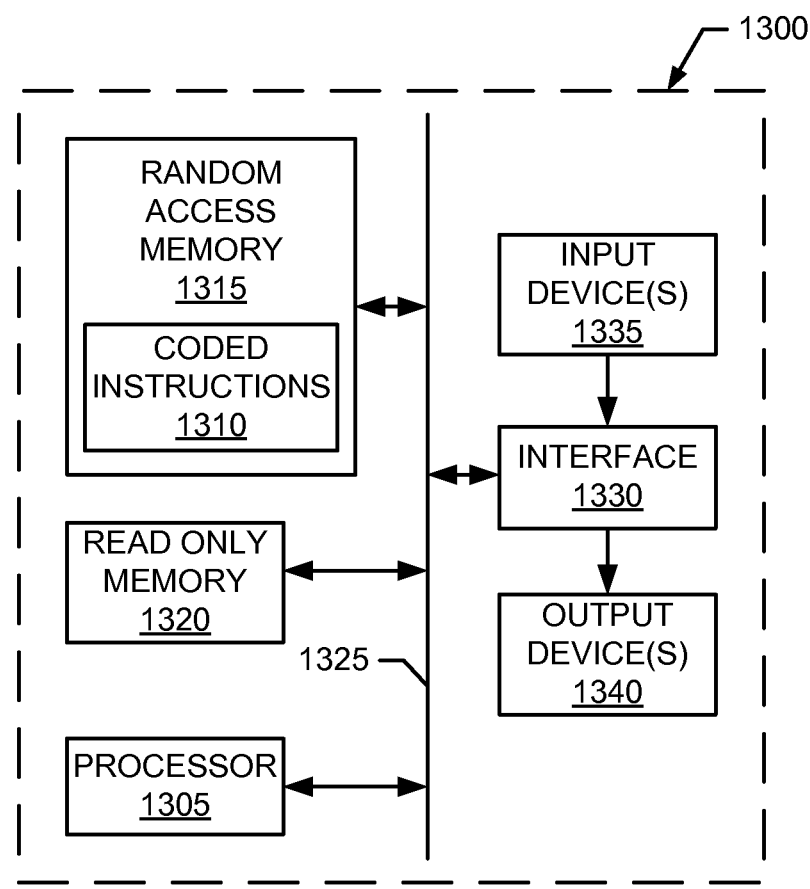
FIG. 13 is a schematic illustration of an example processor platform that may be used and/or programmed to execute any or all of the example machine accessible instructions of FIGS. 4-9 to implement any or all of the example systems, example apparatus and/or example methods described herein.

FIG. 13 is a schematic diagram of an example processor platform 1300 that may be used and/or programmed to implement any or all of the example system 100 and/or any other component described herein. For example, the processor platform 1300 can be implemented by one or more general purpose processors, processor cores, microcontrollers, etc. Additionally, the processor platform 1300 may be implemented as a part of a device having other functionality. For example, the processor platform 1300 may be implemented using processing power provided in a mobile telephone, or any other handheld device.

The processor platform 1300 of the example of FIG. 13 includes at least one general purpose programmable processor 1305. The processor 1305 executes coded instructions 1310 present in main memory of the processor 1305 (e.g., within a RAM 1315 and/or a ROM 1320). The processor 1305 may be any type of processing unit, such as a processor core, a processor and/or a microcontroller. The processor 1305 may execute, among other things, example machine accessible instructions implementing the processes described herein. The processor 1305 is in communication with the main memory (including a ROM 1320 and/or the RAM 1315) via a bus 1325. The RAM 1315 may be implemented by DRAM, SDRAM, and/or any other type of RAM device, and ROM may be implemented by flash memory and/or any other desired type of memory device. Access to the memory 1315 and 1320 may be controlled by a memory controller (not shown).

The processor platform 1300 also includes an interface circuit 1330. The interface circuit 1330 may be implemented by any type of interface standard, such as a USB interface, a Bluetooth interface, an external memory interface, serial port, general purpose input/output, etc. One or more input devices 1335 and one or more output devices 1340 are connected to the interface circuit 1330.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to analyze electronic messages, the method comprising:
    sorting a set of messages based on a set of probabilities, the set of probabilities indicating a likelihood that the set of messages belong to a first classification;
    assigning a first subset of first consecutive ones of the sorted set of messages to a first bucket;
    assigning a second subset of second consecutive ones of the sorted set of messages to a second bucket, wherein a first message of the second subset of messages is consecutive to a last message of the first subset of messages with reference to the set of probabilities;
    determining a mean of probabilities of the first subset of messages assigned to the first bucket;
    storing the mean in a tangible memory; and
    storing, for respective ones of the messages assigned to the first bucket, an indication that the respective message is assigned to the first bucket in the tangible memory,
    wherein storing the mean in a tangible memory further comprises:
        moving a boundary between the first bucket and the second bucket;
        recalculating the mean of probabilities of messages assigned to the first bucket in response to moving the boundary;
        repeatedly (1) moving the boundary and (2) recalculating the mean until deviations of the probabilities within the first bucket with respect to the mean are equal to or less than a threshold; and
        storing a last recalculated mean as representative of the first bucket.

2. The method as defined in claim 1, wherein the mean is a first mean, and further comprising determining a second mean of messages assigned to the second bucket and storing the second mean in the tangible memory.

3. The method as defined in claim 1, wherein the mean is stored in the tangible memory in a first data structure associating an identifier for the first bucket with the mean and wherein the set of messages are stored in the tangible memory in a second data structure different from the first data structure, the second data structure associating one of the messages in the set of messages with an identifier for the first bucket.

4. The method as defined in claim 1, wherein the classification is a sentiment classification.

5. The method as defined in claim 1, wherein the classification is at least one of a positive classification, a negative classification, a mixed classification or a no opinion classification.

6. The method as defined in claim 1, wherein the messages are stored in a data structure, further comprising storing, for each one of the messages, an indication of the number of messages that preceded the one of the messages in the data structure.

7. The method according to claim 1, wherein the indication indicates that the respective message is associated with the mean of probabilities of the first subset of messages.

8. The method according to claim 1, further comprising retrieving the mean for the first bucket in response to the respective message being included in results of a search query.

9. A method to analyze electronic messages, the method comprising:
    sorting a set of messages based on a set of probabilities, the set of probabilities indicating a likelihood that the set of messages belong to a first classification;
    assigning a first subset of first consecutive ones of the sorted set of messages to a first bucket;
    assigning a second subset of second consecutive ones of the sorted set of messages to a second bucket;
    determining a mean of probabilities of the first subset of messages assigned to the first bucket;
    storing the mean in a tangible memory;
    storing, for each one of the messages assigned to the first bucket, an indication that the respective message is assigned to the first bucket in the tangible memory, wherein the mean is a first mean;
    moving a boundary between the first bucket and the second bucket;
    in response to moving the boundary, calculating a second mean of the messages assigned to the changed first bucket; and
    storing the second mean in the tangible memory when the deviations of the probabilities within the first bucket with respect to the mean are equal to or less than a threshold.

10. A tangible computer readable storage medium comprising instructions that, when executed, cause a machine to at least:
    sort a set of messages based on a set of probabilities, the set of probabilities indicating a likelihood that the set of messages belong to a first classification;
    assign a first subset of first consecutive ones of the sorted set of messages to a first bucket;
    assign a second subset of second consecutive ones of the sorted set of messages to a second bucket, wherein a first message of the second bucket is consecutive to a last message of the first bucket with reference to the set of probabilities;
    determine a mean of probabilities of the first subset of messages assigned to the first bucket;
    store the mean in a tangible memory;

store, for respective ones of the messages assigned to the first bucket, an indication that the respective message is assigned to the first bucket in the tangible memory, repeatedly (1) move a boundary between the first bucket and the second bucket and (2) recalculate the mean of probabilities of messages assigned to the first bucket in response to moving the boundary until deviations of the probabilities within the first bucket with respect to the mean are equal to or less than a threshold; and store a last recalculated mean as representative of the first bucket.

11. The tangible computer readable storage medium as defined in claim 10, wherein the mean is a first mean, and further comprising determining a second mean of messages assigned to the second bucket and storing the second mean in the tangible memory.

12. The tangible computer readable storage medium as defined in claim 10, wherein the mean is stored in the tangible memory in a first data structure associating an identifier for the first bucket with the mean and wherein the set of messages are stored in the tangible memory in a second data structure different from the first data structure, the second data structure associating one of the messages in the set of messages with an identifier for the first bucket.

13. The tangible computer readable storage medium as defined in claim 10, wherein the classification is a sentiment classification.

14. The tangible computer readable storage medium as defined in claim 10, wherein the classification is at least one of a positive classification, a negative classification, a mixed classification or a no opinion classification.

15. The tangible computer readable storage medium as defined in claim 10, wherein the messages are stored in a data structure, further comprising storing, for each one of the messages, an indication of the number of messages that preceded the one of the messages in the data structure.

16. A tangible computer readable storage medium comprising instructions that, when executed, cause a machine to at least:

sort a set of messages based on a set of probabilities, the set of probabilities indicating a likelihood that the set of messages belong to a first classification;

assign a first subset of first consecutive ones of the sorted set of messages to a first bucket;

assign a second subset of second consecutive ones of the sorted set of messages to a second bucket;

determine a mean of probabilities of the first subset of messages assigned to the first bucket;

store the mean in a tangible memory;

store, for corresponding ones of the messages assigned to the first bucket, an indication that the respective message is assigned to the first bucket in the tangible memory, wherein the mean is a first mean;

move a boundary between the first bucket and the second bucket;

in response to moving the boundary, calculate a second mean of the messages assigned to the changed first bucket; and store the second mean in the tangible memory when the deviations of the probabilities within the first bucket with respect to the mean are equal to or less than a threshold.

17. An apparatus to analyze a set of electronic messages, the apparatus comprising:

a statistics generator to generate a set of probabilities that the set of messages belong to a first classification;

a tangible memory; and an index generator to sort the set of messages based on a set of probabilities, assign a first subset of first consecutive ones of the sorted set of messages to a first bucket, assign a second subset of second consecutive ones of the sorted set of messages to a second bucket, a first message of the second bucket being consecutive to a last message of the first bucket with reference to the set of probabilities, determine a mean of probabilities of the first subset of messages assigned to the first bucket, store the mean in the tangible memory, and store, for each one of the messages assigned to the first bucket, an indication that the respective message is assigned to the first bucket in the tangible memory, the index generator is further to move a boundary between the first bucket and the second bucket, recalculate the mean of probabilities of messages assigned to the first bucket in response to moving the boundary, repeatedly (1) move the boundary and (2) recalculate the mean until deviations of the probabilities within the first bucket with respect to the mean are equal to or less than a threshold, and store a last recalculated mean as a representative of the first bucket.

18. The apparatus as defined in claim 17, wherein the mean is a first mean, and the index generator is further to determine a second mean of messages assigned to the second bucket and storing the second mean in the tangible memory.

19. The apparatus as defined in claim 17, wherein the mean is stored in the tangible memory in a first data structure associating an identifier for the first bucket with the mean and wherein the set of messages are stored in the tangible memory in a second data structure different from the first data structure, the second data structure associating one of the messages in the set of messages with an identifier for the first bucket.

20. The apparatus as defined in claim 17, wherein the classification is a sentiment classification.

21. The apparatus as defined in claim 17, wherein the classification is at least one of a positive classification, a negative classification, a mixed classification or a no opinion classification.

22. An apparatus to analyze a set of electronic messages, the apparatus comprising:

a statistics generator to generate a set of probabilities that the set of messages belong to a first classification;

a tangible memory; and an index generator to sort the set of messages based on a set of probabilities, assign a first subset of first consecutive ones of the sorted set of messages to a second bucket, determine a mean of probabilities of the first subset of messages assigned to the first bucket, store the mean in the tangible memory, and store for each one of the messages assigned to the first bucket, an indication, wherein the index generator is further to:

move a boundary between the first bucket and the second bucket;

in response to moving the boundary, calculate a second mean of the messages assigned to the changed first bucket; and store the second mean in the tangible memory when the deviations of the probabilities within the first bucket with respect to the mean are equal to or less than a threshold.

* * * * *